Figure 3:
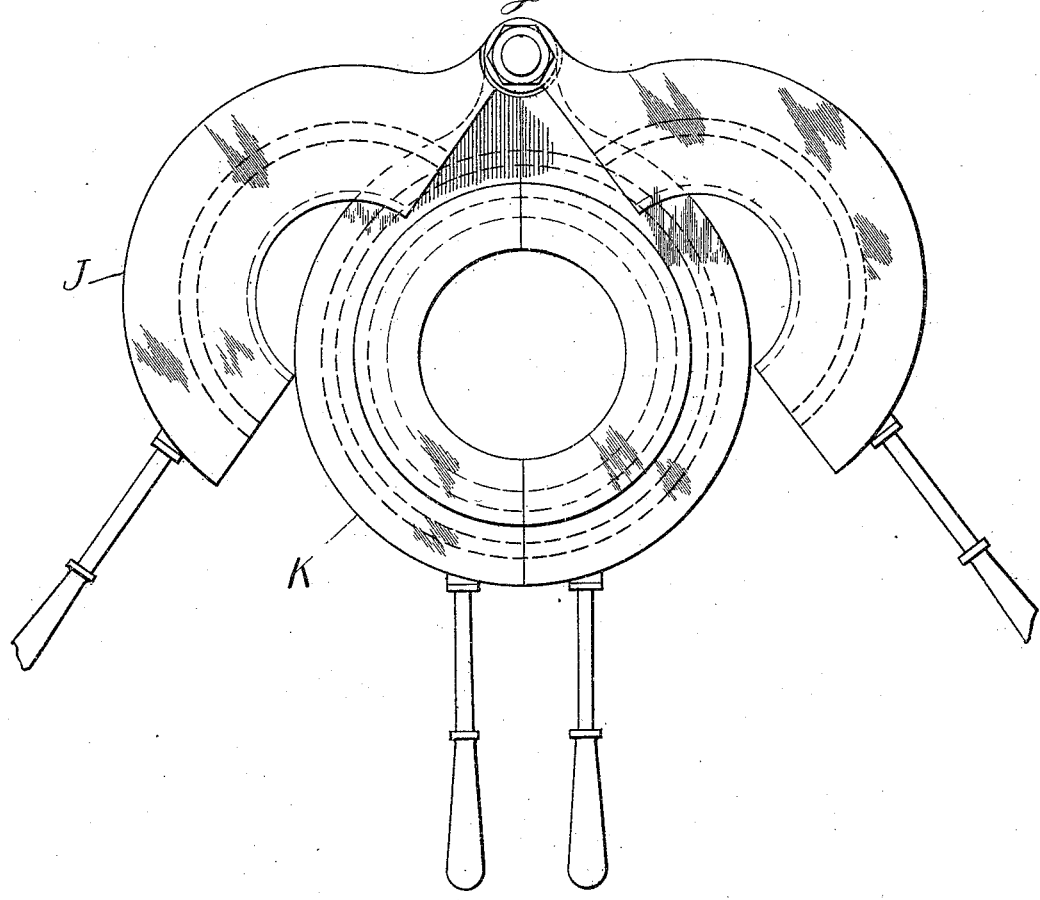

No. 790,715. PATENTED MAY 23, 1905.
H. M. BROOKFIELD.
MACHINERY FOR THE MANUFACTURE OF GLASS INSULATORS OR OTHER GLASS ARTICLES.
APPLICATION FILED JULY 21, 1903.
2 SHEETS—SHEET 1.
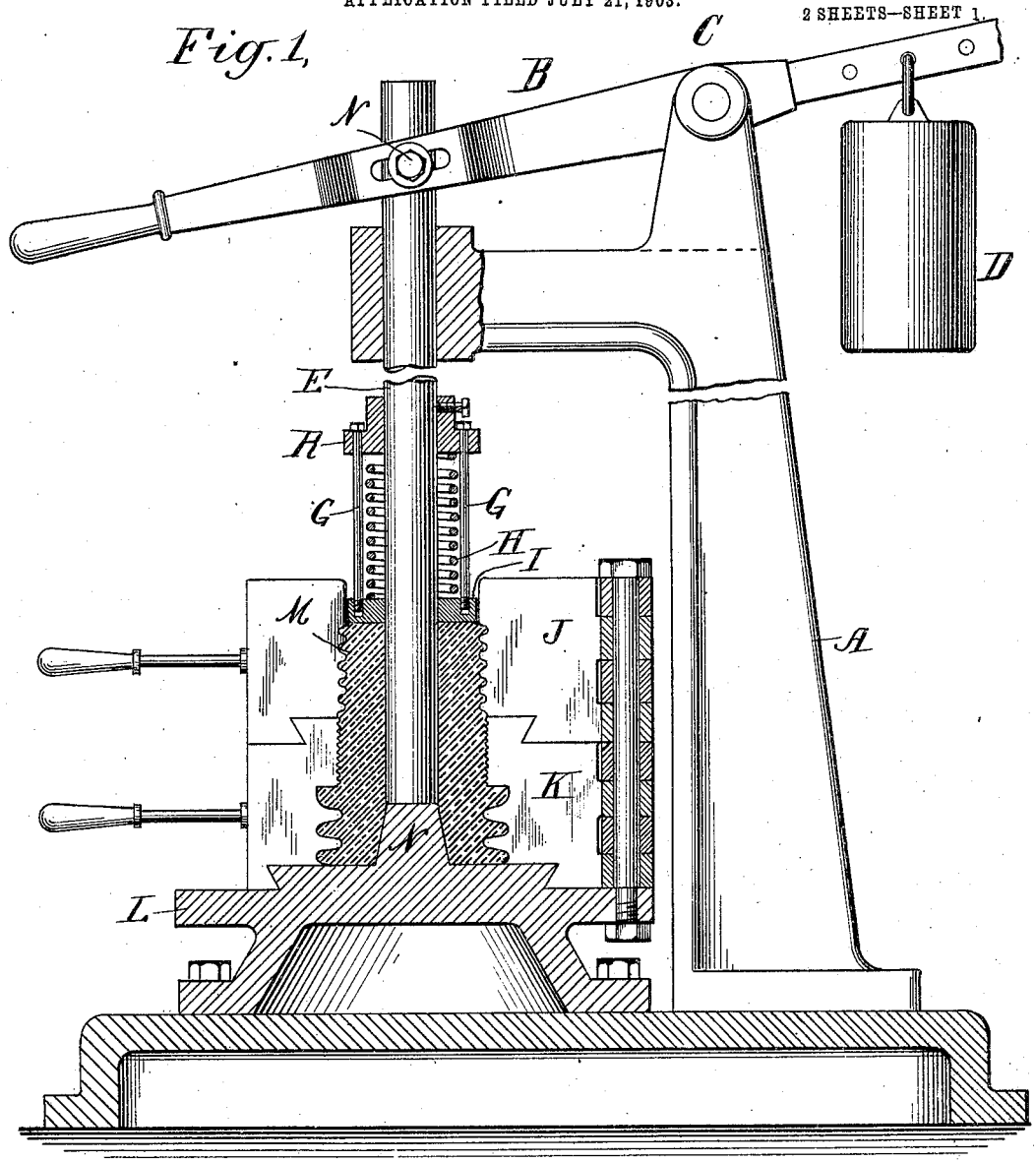
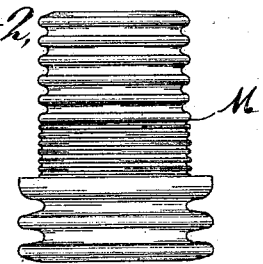
WITNESSES:
Harold North
Thos. A. Lynch
INVENTOR
Henry M. Brookfield
BY
Frank Brookfield
ATTORNEY No. 790,715. PATENTED MAY 23, 1905.
H. M. BROOKFIELD.
MACHINERY FOR THE MANUFACTURE OF GLASS INSULATORS OR OTHER GLASS ARTICLES.
APPLICATION FILED JULY 21, 1903.

2 SHEETS—SHEET 2.

No. 790,715.   Patented May 23, 1905.

UNITED STATES PATENT OFFICE.

HENRY M. BROOKFIELD, OF NEW YORK, N. Y.

MACHINERY FOR THE MANUFACTURE OF GLASS INSULATORS OR OTHER GLASS ARTICLES.

SPECIFICATION forming part of Letters Patent No. 790,715, dated May 23, 1905.

Application filed July 21, 1903. Serial No. 166,453.

*To all whom it may concern:*

Be it known that I, HENRY M. BROOKFIELD, of 516 Madison avenue, New York city, in the county of New York and State of New York, have invented a new and useful Improvement in Machinery for the Manufacture of Glass Insulators or other Glass Articles, of which the following is a specification.

My invention relates to a machine for molding glass articles, preferably insulators; and my object is to improve and simplify the same.

In the drawings, which show the preferred form of my invention, Figure 1 is a side elevation, partly in central vertical section. Fig. 2 is a side elevation of the insulator molded by this particular machine; and Fig. 3 is a plan view of the upper and lower parts of the mold, the upper half being open to show how the upper part may be removed.

In carrying out my invention in its preferred form I provide a mold into which a plunger is suitably reciprocated to displace the plastic glass which may be contained in the mold. In the actual operation of molding such articles the operator gathers a quantity of glass upon an end of a rod and drops it into the mold, and his judgment must be relied upon to determine the quantity of glass which is required, and it is extremely difficult to obtain exactly the same proportions at all times. If the mold, however, is of a fixed shape and he gathers too little glass, the machines of the prior art have resulted in an imperfectly-formed article. For example, if he gathers too little glass the follower which surrounds the plunger and which is brought down on top of the mold, where it rests supported by the mold, will not touch the glass, and the upper end of the glass will therefore not be pressed upon by such follower, and the article will be imperfectly formed at this point. In my preferred construction, however, I have provided a mold which has an opening therein, the upper portion of which opening is of the same size as the follower for a distance downward into the mold, and also a suitable spring for the follower, which forces the follower down upon the glass so that it will press upon the glass even if slightly too little glass has been gathered.

In the preferred embodiment of my invention shown in the drawings J K represent a mold having a hole therein for the reception of the glass M. The upper portion of this hole is of the same size for some distance downward into the mold, and the follower I, which fits and is slidable upon the plunger E, closely fits this opening. The follower is slidable on the plunger, and I may provide a follower-plate R and rods G G, passing through the same and screwing into the follower in order to guide the latter. The follower-plate R may be adjustable upon the plunger E by means of the set-screw shown.

H is one form of a spring for forcing the follower away from the follower-plate R.

The plunger may be suitably reciprocated—as, for example, by a lever B, pivoted at C and connected to the plunger at N.

D is a counterweight which may be provided, if desired.

L is the base of the mold, and I may provide a projection N, forming a part of the bottom of the mold, if desired.

The operator drops the plastic glass into the mold, and the plunger is forced downward, entering the glass and displacing it, so as to fill all the recesses, the glass rising upward in the mold and meeting the follower I as the plunger continues to descend, the follower then pressing tightly and resiliently against the glass. The follower, as it is supported entirely by the glass and not by the mold, may, if too little glass has been gathered, move down slightly farther and so press upon the upper portion of the glass instead of being checked by and supported upon a portion of the mold. This insures the proper formation of the upper portion of the article, even though too little glass has been gathered. This is one feature of my invention. The plunger may, if it is desired to form a hole entirely through the article, be of sufficient length to reach the bottom of the mold, as shown. Another feature of my invention relates to the formation of the mold itself. It will be observed that that part of the mold above the base L is divided transversely—that is, transversely to the axis of the hole or the plunger—so that the upper part J thereof may be removable. Preferably both the upper part J and the lower part K are each divided vertically, the two halves of each being pivoted together, whereby they may be swung apart. As shown in Fig. 3, the upper part J may be removed by swinging the two halves apart. The plunger E is adapted (when said two parts are assembled as shown in Fig. 1) to enter the hole in the mold and pass into the hole contained in the lower part K of the mold, so as to displace the plastic glass and force part of it upward into the hole in the upper part J. This is a distinct advantage, because the transverse or horizontal division between the upper and lower parts of the mold may be at such a point that if the operator merely fills the hole in the lower part he will have just enough glass to properly form the article, and if he gathers a little too much this can easily be removed, and the amount which projects from the lower part when in the position shown in Fig. 3 may be easily cut off, and the operator will then know that he has the proper amount of glass. It would be very hard to do this without being able to remove the upper part of the mold. In this way the operator will more certainly form a perfect article, and consequently save much material and time, which is often lost by too little glass being dropped into the mold, which might form an imperfect article, which would have to be thrown away. The proper point of division between the upper and lower part of the mold may easily be determined for the different articles to be formed.

I am aware that variations may be made from the construction illustrated and described without departing from the spirit of my invention as claimed, and I therefore do not desire to be limited to the particular construction shown in the drawings.

What I claim is—

1. In a molding-machine in combination, a mold having an opening therein adapted to receive plastic glass, said opening being of the same size for a distance downward into said mold, a reciprocating plunger adapted to enter said mold and displace the glass therein, a reciprocating follower surrounding and fitting said plunger and slidable thereon, and a spring for yieldingly resisting upward movement of said follower on said plunger, said follower fitting closely into the opening in said mold and adapted to rest solely upon the glass displaced by said plunger.

2. In a molding-machine in combination, a mold having an opening therein adapted to receive plastic glass, said opening being of the same size for a distance downward into said mold and of a larger size below, a reciprocating plunger adapted to enter said mold and displace the glass therein, a reciprocating follower surrounding and fitting said plunger and slidable thereon, and a spring for yieldingly resisting upward movement of said follower on said plunger, said follower fitting closely into the opening in said mold and adapted to rest solely upon the glass displaced by said plunger.

3. In a molding-machine in combination, a mold having an opening therein adapted to receive plastic glass, said opening being of the same size for a distance downward into said mold, a reciprocating plunger adapted to enter said mold and displace the glass therein, a reciprocating follower carried by and surrounding and fitting said plunger and slidable thereon, and a spring for yieldingly resisting the upward movement of said follower on said plunger, said follower fitting closely into the opening in said mold and adapted to rest solely upon the glass displaced by said plunger, and means whereby the position of said follower may be adjusted along said plunger.

4. In a molding-machine in combination, a mold having an opening in the same to receive plastic glass, said mold being divided transversely of said hole into two parts, the upper part thereof being removable, a plunger adapted (when said two parts are assembled) to enter said hole and pass into the hole contained in the lower part of said mold, to force some of the said glass into said upper part, and a follower surrounding said plunger and adapted to resiliently press upon said glass.

5. In a molding-machine in combination, a mold having an opening in the same to receive plastic glass, said mold being divided transversely of said hole into two parts, the upper part thereof being divided vertically, the two sides thereof being pivoted together, whereby they may be swung apart, a plunger adapted (when said two parts are assembled) to enter said hole and pass into the hole contained in the lower part of said mold, to force some of the said glass into said upper part, and a follower surrounding said plunger and adapted to resiliently press upon said glass.

6. In a molding-machine in combination, a mold having an opening in the same to receive plastic glass, said mold being divided transversely of said hole into two parts, the upper part thereof being removable, a plunger adapted (when said two parts are assembled) to enter said hole and pass into the hole contained in the lower part of said mold, said plunger being of a length sufficient to pass to the bottom of said mold, to force some of the said glass into said upper part, and a follower surrounding said plunger and adapted to resiliently press upon said glass.

In testimony whereof I have signed my name to this specification in the presence of two subscribing witnesses.

HENRY M. BROOKFIELD.

Witnesses:
 HAROLD NORTH,
 THOS. S. LYNCH.